United States Patent [19]

Nagai

[11] 4,270,160

[45] May 26, 1981

[54] LIGHTNING RESISTIVE DEVICE IN AERIAL POWER TRANSMISSION SYSTEM

[75] Inventor: Nobuo Nagai, Amagasaki, Japan

[73] Assignee: Mitsubishi Denki Kabushiki Kaisha, Tokyo, Japan

[21] Appl. No.: 21,175

[22] Filed: Mar. 16, 1979

[30] Foreign Application Priority Data

Mar. 17, 1978 [JP] Japan ................... 53-31294

[51] Int. Cl.³ .......................................... H02H 9/04
[52] U.S. Cl. .................... 361/132; 361/127; 174/2; 174/45 R
[58] Field of Search .............. 361/132, 131, 117, 127, 361/128, 126, 107, 118, 56; 174/2, 45 R; 338/21, 20

[56] References Cited

U.S. PATENT DOCUMENTS

| | | | |
|---|---|---|---|
| 1,937,296 | 11/1933 | Sporn et al. .................. | 361/132 X |
| 2,539,749 | 1/1951 | Nelson ........................ | 361/127 |
| 3,259,762 | 7/1966 | Skuderna ..................... | 174/2 X |
| 3,339,116 | 8/1967 | Harmon ....................... | 361/127 X |
| 3,371,144 | 2/1968 | Griscom ....................... | 361/117 X |
| 3,693,053 | 9/1972 | Anderson ..................... | 361/56 X |
| 3,805,114 | 4/1974 | Matsuoka et al. ............. | 338/21 X |
| 4,161,012 | 7/1979 | Cunningham .................. | 361/127 X |

*Primary Examiner*—Patrick R. Salce
*Attorney, Agent, or Firm*—Oblon, Fisher, Spivak, McClelland & Maier

[57] ABSTRACT

Lightning arresters comprising each non-linear resistor made of a main component of zinc oxide and the other minor component are connected between a steel tower and a power transmission cable supported on the steel tower by an insulator and between the power transmission cables in different phases whereby the lightning resistance of the aerial power transmission system is improved.

4 Claims, 9 Drawing Figures

4,270,160

LIGHTNING RESISTIVE DEVICE IN AERIAL POWER TRANSMISSION SYSTEM

BACKGROUND OF THE INVENTION

The present invention relates to a lightning resistive device for preventing lightning damage in an aerial power transmission system by connecting lightning arresters on a steel tower supporting aerial power transmission cables.

In the conventional aerial power transmission system, an aerial ground wire is suspended on tops of steel towers to protect the power transmission cables supported on the steel towers by insulators from lightning damage. In such a system, lightnings are collected to the aerial ground wire and the power transmission cables are protected from the direct lightning in the shielding angle of the aerial ground wire.

However, in such a conventional system, when lightning energy to the aerial ground wire is too large, a potential of the steel tower is suddenly raised to cause reverse flashover to the power transmission cable whereby a grounding fault may be caused.

In order to prevent the lightning damage, it has been proposed to connect lightning arresters between the power transmission cables and the ground to reduce the lightning damage in some districts. However, it has been difficult to prepare lightning arresters durable to direct lightning from the technological viewpoint and effect for preventing the lightning damage of the power transmission cables has not been substantially expected.

Recently, excellent non-linear resistors of sintered products prepared by sintering a composition of a main component of zinc oxide and the other minor component at high temperature, have been developed. Therefore non-dynamic current type lightning arresters for power transmission system could be obtained by using such non-linear resistor, whereby an operation duty to the direct lightning of about 100 KA could be expected.

SUMMARY OF THE INVENTION

It is an object of the present invention to provide a lightning resistive device for aerial power transmission system by connecting compact type lightning arresters durable to direct lightning to power transmission cables.

It is another object of the present invention to provide a lightning resistive device for aerial power transmission system which prevents reverse flashover phenomenon in the aerial power transmission cables by connecting lightning arresters to reduce lightning damage whereby spaces between cables can be reduced and a size of steel towers can be reduced.

BRIEF DESCRIPTION OF THE DRAWINGS

In the drawings, the same references designate identical or corresponding parts.

DESCRIPTION OF THE PREFERRED EMBODIMENTS

Figure 1:
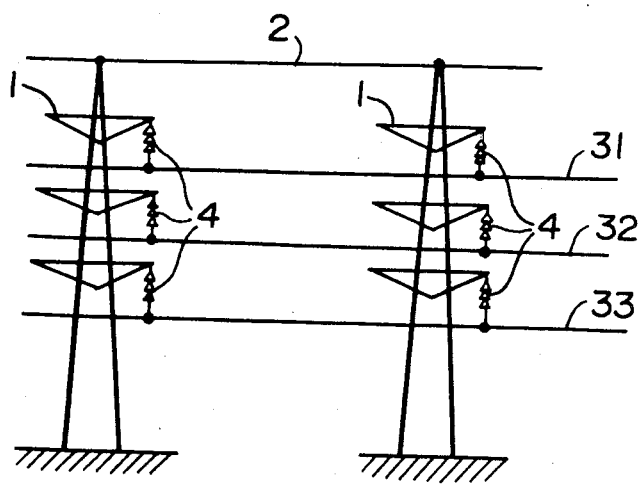
FIG. 1 shows the conventional aerial power transmission system connecting a lightning resistive device.

FIG. 1 shows aerial power transmission system wherein the reference numeral (1) designates steel towers placed with suitable distance; (2) designates an aerial ground wire suspended between tops of the steel towers; (31) (32) and (33) designate respectively power transmission cables in upper, middle and lower phases which are supported between the tops of steel towers; (4) designates an insulator for supporting each power transmission cable in each phase on each steel tower.

In the conventional system, as shown in FIG. 1, the aerial ground wire (2) is suspended to protect the power transmission cables (31), (32) and (33) from lightning damage. That is, the power transmission cables (31), (32) and (33) are protected in the shielding angle by the aerial ground wire (2) to protect the cables from the direct lightning.

However, when the lightning energy to the aerial ground wire (2) is too large and the potential difference between the aerial ground wire (2) and the steel tower (1) is raised over the insulation withheld voltage of the insulator (4), the insulator (4) is also in flashover to cause the reverse short-circuit phenomenon. Thus, the reverse flashover causes a damage of the power transmission cables (31), (32) and (33) which is similar to that of direct lightning.

In the conventional system, a lightning arrester is not practically connected to the power transmission cable, because it has been difficult to prepare a lightning arrester durable to the direct lightning from the technical viewpoint.

Recently, non-linear resistors, prepared by sintering a composition comprising a main component of zinc oxide at higher temperature, have been used whereby a lightning arrester element which has excellent non-linear resistive characteristics and through which a dynamic current is not passed during the operation, can be prepared.

It is possible to prepare a lightning arrester element for treating energy of the direct lightning by using the non-linear resistor.

Figure 2:
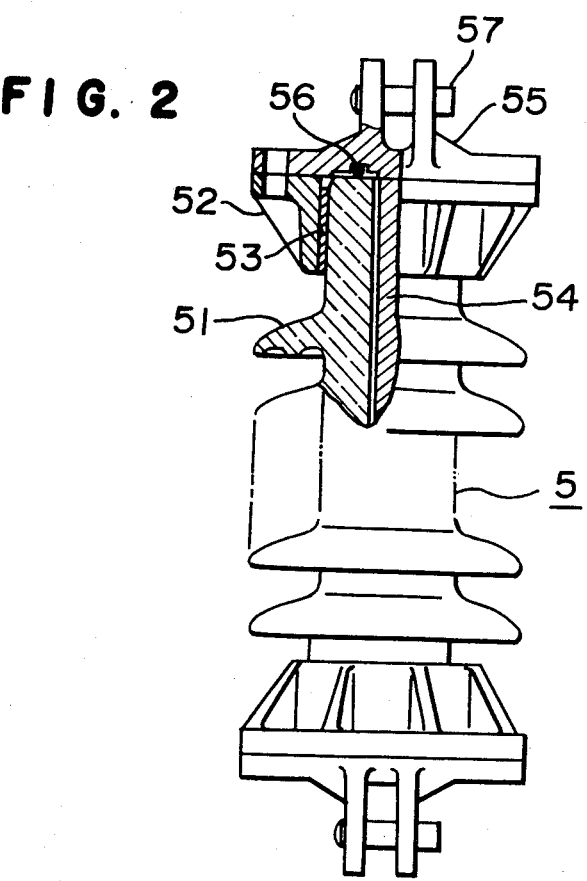
FIG. 2 is a partially sectional view of an insulator containing a lightning arrester used in the present invention.
Figure 3:
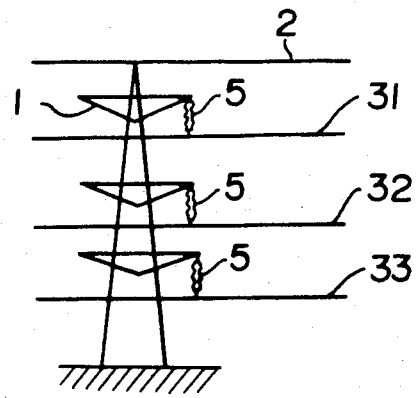
FIG. 3 shows the aerial power transmission system connecting one embodiment of a lightning resistive device of the present invention.

As shown in FIG. 2, the lightning arrester element (54) made of sintered product of a main component of zinc oxide is held inside the hollow long trunk insulator (51) to obtain the insulator (5) comprising the lightning arrester. The reference numeral (52) designates a flange; (53) designates a cement bonded part for bonding the flange (52) to the long trunk insulator (51); (55) designates a metal cover; (56) designates a packing for shielding; and (57) designates a pin for a connecting fitting. When the insulator (5) is used in the power transmission system, the power transmission cables (31) to (33) are protected by the lightning arrester device which is also used as a long trunk insulator as shown in FIG. 3 whereby lightning reverse flashover from the aerial ground wire (2) can be prevented. However, when it is not enough to support in strength the power transmission cables (31) to (33) only by the long trunk insulator-lightning arresters (5), it is possible to connect the long trunk insulator-lightning arresters (5) between the steel tower (1) and the power transmission cables (31) to (33) in parallel to the conventional long trunk insulators (4) on each steel tower (1) as shown in the embodiment of FIG. 4.

When the power transmission cables (31) to (33) are supported by the insulators (4) and the insulator-lightning arresters (5), they are preferably arranged to form V-shape by the insulators (4) and the insulator-lightning arresters (5) and to support the power transmission cables (31) to (33) at each common connecting edges from the viewpoint of safety and strength.

Figure 4:
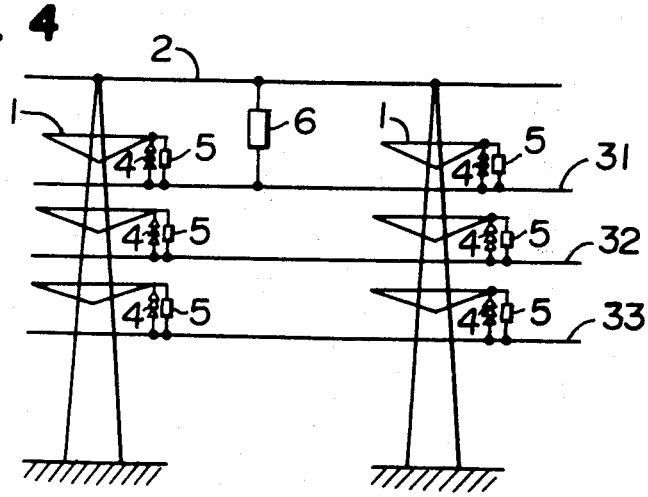
FIG. 4 shows the aerial power transmission system connecting the other embodiment of a lightning resistive device of the present invention.

In order to improve lightning durability in the embodiment of FIG. 4, a lightning arrester (6) is connected between the aerial ground wire (2) and the power transmission cable (31) at suitable place between the steel towers (1). The lightning arrester (6) can be the same as the insulator-lightning arrester (5) used for supporting the power transmission cables (31) to (33).

In this embodiment, the power transmission system can be completely protected from the lightning damage.

In the lightning to the aerial ground wire (2) near the steel tower (1), the lightning arrester (5) is effectively used to protect the power transmission cables (31), (32), (33) from the lightning damage.

In the lightning to the aerial ground wire (2) between adjacent steel towers (1), the lightning arrester (6) and the lightning arresters (5) on the steel tower (1) are effectively used to protect the power transmission cables (31), (32), (33) from the lightning damage. Therefore, if the shielding by the aerial ground wire (2) is complete, the power transmission cables (31), (32), (33) can be protected from the reverse flashover at the direct lightning to the aerial ground wire (2) so as to attain the lightning durable design.

Figure 5:
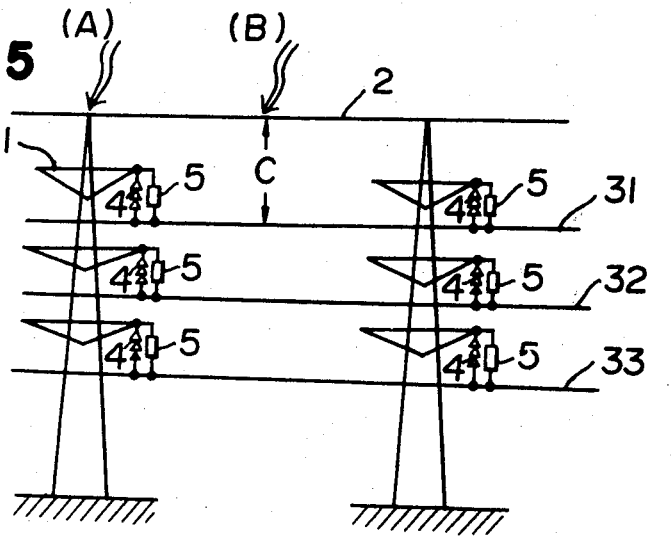
FIG. 5 shows the system for illustrating the operation of the embodiment of FIG. 4.

In order to illustrate the effect of the lightning arrester (6), it is firstly considered to connect only the lightning arrester (5) near the steel tower as shown in FIG. 5.

In the structure of FIG. 5, the lightning (A) to the aerial ground wire (2) near the steel tower (1) is considered. The cables, in phases, are protected by the lightning arrester (5) without causing the reverse flashover even though excess potential raising is caused between the cables and the steel tower.

In the case of the lightning (B) to the aerial ground wire (2) between the adjacent steel towers, the abnormal voltage is applied to both directions on the aerial ground wire (2) to raise the potential of the the steel towers (1). However, the cables are protected by the lightning arresters (5) as the same with that of the lightning (A). However, in the case of the lightning (B), there is the possibility to raise suddenly the potential difference (C) between the aerial ground wire (2) at the lightning part and the cable (31) before imparting effect of the lightning arrester (5) at the steel tower when it is steep wave lightning.

It is considered that the possibility of reverse flashover of the aerial ground wire (2) and the cable (31) in the upper phase caused by the potential difference (C) is substantially small in the high voltage power transmission system. For example, in the power transmission system of 500 KV, an aerial space of longer than 15 m is kept between the aerial ground wire (2) and the power transmission cable (31) in the upper phase and accordingly, a possibility of the flashover is not substantially considered. However, in practical phenomenon, a flashover is caused sometime. This is considered to be effect of ionization of air around the lightning part when the aerial ground wire (2) is struck by lightning to reduce the withstand voltage.

When the transmission voltage in the power transmission system is lower, the aerial space is narrower than 15 m, to increase the possibility of flashover caused by the overvoltage (C). In order to prevent the flashover in the latter case, it is preferable to connect the lightning arrester (6) between the aerial ground wire (2) and the power transmission cable (31) in the upper phase.

Figure 6:
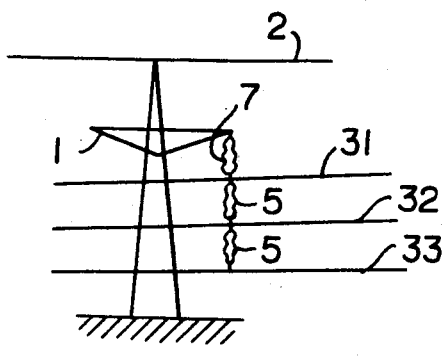
FIGS. 6 and 7 show the aerial power transmission system connecting the other embodiment of the lightning resistive device of the present invention.
Figure 7:
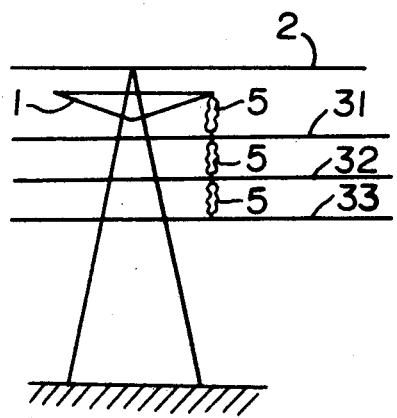

The embodiments of FIGS. 6 and 7 provide the lightning resistive aerial power transmission system which allows smaller size of steel towers.

In the embodiments of FIGS. 3 and 4, the power transmission cables (31) to (33) in different phases are separately supported by each different arm on the steel tower (1). On the other hand, in the embodiments of FIGS. 6 and 7, the insulator-lightning arresters are connected between the cables (31) to (33) to support the cables whereby smaller size of the steel towers (1) can be used.

In the embodiment of FIG. 6, two insulator-lightning arresters (5) having the structure of FIG. 2 are connected in series between the cables (31) to (33) together with the long trunk insulator (7) having arc horn type lightning arrester in series. The characteristics of the insulator-lightning arrester (5) is the non-linear characteristic in level of protection for controlling abnormal voltage caused between the phases of the cables to suitable voltage.

In accordance with the system, the insulators (5) contain each lightning arrester whereby mutual short-circuit is not caused in the lightning.

On the other hand, the spaces between the cables (31) to (33) in different phases can be narrower and the number of the arms on the steel tower can be reduced from three arms to one arm to be lower steel tower in comparison with the system of FIG. 3.

Figure 8:
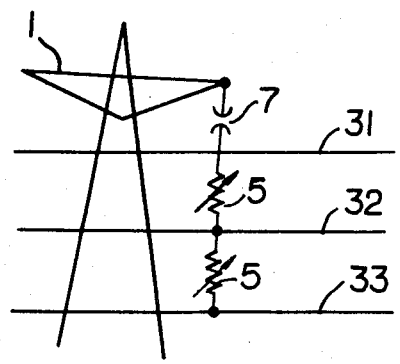
FIG. 8 is a diagram of equivalent circuit of the embodiment of FIG. 6.

The equivalent circuit of the system of FIG. 6 is shown in FIG. 8.

As shown in FIG. 8, the mutual protection is considered in the system of FIG. 6. However, the conventional long trunk insulator (7) having arc horn type lightning arrester is connected to the ground wire whereby the flashover factor to the ground is not reduced from that of the conventional system but the mutual short-circuit is prevented and a height of the steel tower can be decreased.

FIG. 7 shows the other embodiment of the present invention, wherein the insulator-lightning arrester (5) shown in FIG. 2 is used for supporting the cable (31) in the upper phase.

Figure 9:
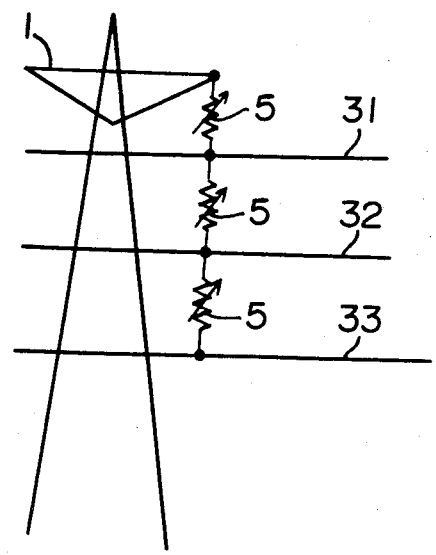
FIG. 9 is a diagram of equivalent circuit of the embodiment of FIG. 7.

The equivalent circuit of the system of FIG. 7 is shown in FIG. 9.

In accordance with the system of FIG. 7, the protection of the cables between phases and to the ground can be attained to prevent completely the lightning damage and the height of the steel towers can be decreased.

Sometimes, a composite aerial power transmission system where many power transmission cables for different voltages are supported on the same steel towers, has been employed.

In accordance with the systems of FIGS. 6 and 7, height of the steel towers can be remarkably decreased advantageously. On the other hand, when the height of the steel towers is the same, the number of the circuits in the composite system can be increased.

The embodiments have been illustrated for the use of one long trunk insulator and one insulator-lightning arrester. However, it is possible to connect the insulators or the insulator-lightning arresters in series as desired in the case of high voltage such as a super-high voltage system.

In accordance with the present invention, the reverse flashover phenomenon in the aerial power transmission cables can be prevented and the spaces between cables can be reduced and the size of steel towers can be reduced and excellent lightning durable aerial power transmission system can be provided.

What is claimed is:

1. A power transmission system including lightning resistive means, comprising:
   at least one steel tower;
   at least three power transmission cable means conducting three current phases;
   a first lightning resistive means connected between each said at least one steel tower and one of said power transmission cable means, said lightning resistive means supporting said one of said power transmission cable means; and
   additional lightning resistive means serially connecting the remainder of said power transmission cable means to one another and to said first power transmission cable means in a vertically suspended array, for supporting said remainder,
   wherein at least said additional lightning resistive means comprises an insulator and a lightning arrester including a nonlinear resistor having as a main component zinc-oxide sintered at high temperature.

2. A lightning resistive device according to claim 1 wherein said lightning arrester is held inside said insulator.

3. A lightning resistive device according to claim 1 wherein an aerial ground wire is supported at tops of said at least one steel tower and another lightning arrester is connected between said aerial ground wire and at least one of said power transmission cable means.

4. A lightning resistive device according to claim 1 wherein said first lightning resistive means comprises a long trunk insulator having an acr horn type lightning arrester and an insulator containing a lightning arrester made of a sintered product comprising a main component of zinc oxide sintered at high temperature.

* * * * *